United States Patent [19]

Jorgenson et al.

[11] 4,075,374

[45] Feb. 21, 1978

[54] FLOOR PREPARATION AND METHOD

[75] Inventors: Clyde R. Jorgenson; Harold M. DeBoer; Ronald M. Jorgenson, all of Minneapolis, Minn.

[73] Assignee: Acoustical Floors, Inc., Hamel, Minn.

[21] Appl. No.: 600,461

[22] Filed: July 30, 1975

[51] Int. Cl.² .............................................. B05D 3/12
[52] U.S. Cl. ............................ 427/355; 106/90; 260/29.6 S; 260/42.13; 264/31; 404/72; 404/82; 404/97; 404/101
[58] Field of Search .......... 106/90; 260/29.6 S, 260/42.13; 404/72, 82, 97, 101; 427/136, 355; 264/31

[56] References Cited

U.S. PATENT DOCUMENTS

| 2,078,289 | 4/1937 | Sloan | 404/82 X |
|---|---|---|---|
| 2,943,953 | 7/1960 | Daniel | 404/82 X |
| 3,869,415 | 3/1975 | Williams | 260/29.6 X |
| 3,895,018 | 7/1975 | Adolf | 260/29.6 X |
| 3,947,398 | 3/1976 | Williams | 260/29.6 X |

Primary Examiner—Michael R. Lusignan
Attorney, Agent, or Firm—Fredrikson, Byron, Colborn, Bisbee & Hansen

[57] ABSTRACT

A runny, watery, self-leveling slurry is disclosed for pouring of a floor having low sound transmissivity. The slurry includes pressure-calcined calcium sulfate hemihydrate, sand, a polymeric latex, an antifoam agent, and sufficient water to provide the slurry with a water-like consistency. Also disclosed is a method for preparing the floor in which a polymeric latex is first applied to a subfloor, the latex retarding seepage of water from the watery slurry into the floor and migrating into and becoming part of the resultant poured floor to improve adhesion between the poured floor and the subfloor.

4 Claims, 5 Drawing Figures

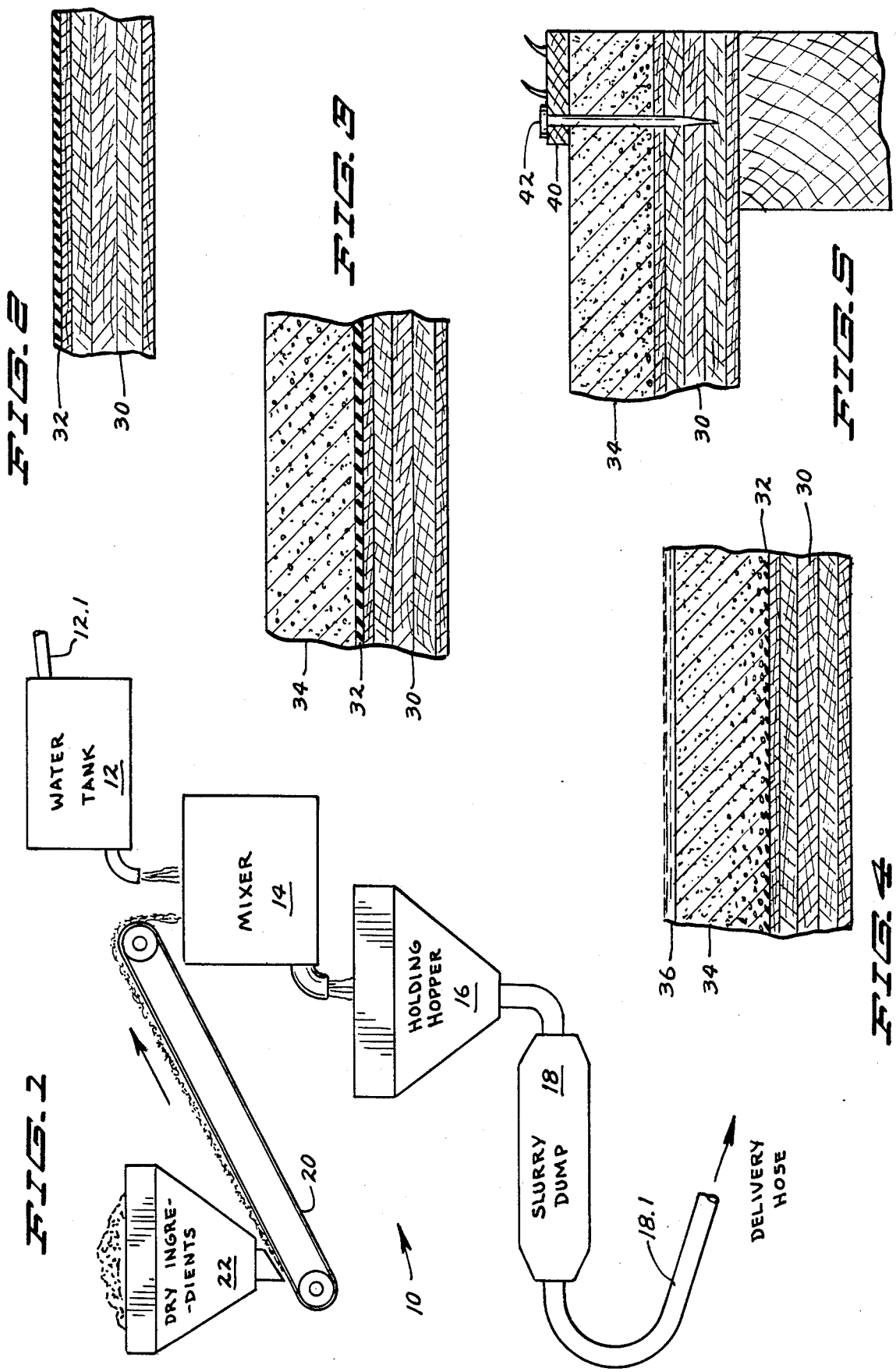

FLOOR PREPARATION AND METHOD

BACKGROUND OF THE INVENTION

In the construction industry, the problem of noise transmission from one room to another within a building has become significant with the advent of large office buildings and huge apartment complexes. It is important that the floors, walls, and ceilings of offices or apartments be sound-insulated so that speech, music, or like sounds from one room are not heard in an adjoining room. Good sound insulation is particularly important in flooring since the flooring must not only resist transmission of airborne sounds such as music or speech, but must also insulate against impact-produced sounds resulting from walking, moving of furniture, and the like.

Sound-insulating flooring which has previously been used, or which is in present use, is generally either difficult to install, yields poor sound insulating qualities or is quite expensive. To prepare one such floor, a thick, wet mixture of Portland cement with sand is poured in the usual manner onto a subfloor, this well-known cement thereafter being troweled and finished to provide a smooth flooring. Since the horizontal dimensions of a floor in an office or apartment are fixed by the walls, shrinkage during setting of a poured Portland cement floor results in cracks in the floor which can seriously reduce the effectiveness of the floor as a sound barrier. Since the concrete mixture is quite thick and pasty, considerable effort and time and hence expense, is involved in pouring and finishing a floor of this type.

Other sound-insulating floors involve the installation of pre-formed sheets of particle board or of gypsum-type sheetrock. Considerable effort is required in cutting such pre-formed sheets to the exact size of the floor so as to avoid cracks or fissures between abutting sheets or between the edges of the sheets and the walls. Since the sheets must be cut to size, a considerable waste of material results.

To form a good acoustic barrier, an acoustic flooring layer should be free of cracks and should extend into abutment with the walls. In addition, the flooring should be capable of having nails pounded through it without chipping, as when carpeting is laid over the flooring. For good resistance to sound transmission, the flooring should be generally quite dense. Further, at least the upper surface of the flooring should be hard so as to resist denting or other deforming which may be caused by accidental dropping of heavy objects on the floor or by applying continuous, concentrated weight to the floor as by the feet of a waterbed or refrigerator or other heavy object. From an economic standpoint, the floor should be quickly and easily laid and finished.

The subfloor, or underlayment, upon which acoustic flooring is installed often is plywood, which may delaminate when soaked with water. Moreover, the walls of offices and apartment complexes quite commonly are of a gypsum-type wallboard which may be damaged when soaked with water. To avoid water damage to the subfloor and wallboard, some means of controlling water seepage is required to prevent water damage when an acoustic floor is prepared from a water-containing mixture such as that described above.

A flooring which can be easily poured and finished with a minimum expenditure of time and without waste of material, which would avoid water damage to subflooring and wallboards, which would be highly resistant to cracking or chipping in use, which would extend completely to the walls and be anchored securely to the subflooring, and which would offer high resistance to sound transmission, is much to be desired.

BRIEF SUMMARY OF THE INVENTION

The invention relates to a hardenable slurry for pouring an acoustic floor. The slurry, when mixed, has a runny, watery, self-leveling consistency such that when the slurry is poured on subflooring, it tends to level itself with a minimum of subsequent finishing required. Because of its watery consistency, the slurry, when poured, extends into contact with the surrounding walls of a room.

The slurry of the invention includes 10 parts by weight of pressure-calcined calcium sulfate hemihydrate, 38–48 parts by weight of sand, an aqueous polymeric latex dispersion to harden the surface of the resulting floor, and an antifoaming agent which substantially prevents foam production when the watery, runny slurry is mixed. The slurry additionally contains sufficient water, in the range of about 4 to 10 parts by weight, to provide the slurry with a watery, runny, easily dripping, self-leveling consistency. Desirably, the slurry further includes an accelerator, such as aluminum sulfate or potassium sulfate, in sufficient quantity to provide the slurry with a set-up time of from about 15 minutes to about 2 hours, and preferably from about 20 minutes to about 60 minutes at room temperature (i.e., about 70° F.). Set-up time, as used herein, refers to the time between mixing of slurry and the time the slurry sets up into a solid mass, as will be further explained below. The slurry may also contain a small amount of Portland cement to reduce any expansion of the slurry as it sets up.

The invention also relates to a method of preparing a floor from the thus-described slurry in which the slurry is first mixed with violent agitation and without significant foam production, and is then poured onto a subfloor to a predetermined thickness, the slurry flowing easily into a substantially level and uniform layer upon the subfloor and extending to the walls. The surface of the watery slurry layer is lightly swept ("floated") with a wooden float to provide a top surface rich in latex and calcium sulfate hemihydrate. The subsequent water layer which is formed on the top surface of the slurry is rapidly evaporated. In the method of the invention, the rapid set-up time of the slurry causes the heat which is produced to evaporate the water layer quickly, thereby substantially preventing water damage to walls. Desirably, the subfloor (which may be plywood) is initially wetted with an aqueous, film-forming, polymeric latex dispersion which, upon drying, seals the subfloor against water penetration. The seal layer retards seepage of water from the subsequently applied watery slurry into the subfloor, the latex migrating into and becoming part of the resultant acoustic floor and increasing adhesion between the latter floor and the subfloor.

BRIEF DESCRIPTION OF THE DRAWING

FIG. 1 is a schematic view of equipment which is employed for making and pumping the watery slurry of the invention;

FIGS. 2, 3 and 4 are broken away, cross-sectional views of a subfloor in successive stages of the preparation of the flooring of the present invention; and FIG. 5 is a cross-sectional, broken away view of a floor of the invention in place upon a subfloor and to which has been affixed a carpet installation strip.

BRIEF DESCRIPTION OF THE PREFERRED EMBODIMENT

The primary ingredients of the watery slurry of the invention are pressure-calcined calcium sulfate hemihydrate (in powder form), sand, a film-forming aqueous polymeric latex, an antifoaming agent, and water in large proportions. The ratio of water to the calcium sulfate hemihydrate, in parts by weight, is at least about 0.4/1, and the ratio of sand to calcium sulfate hemihydrate should be at least about 3.8/1, but not greater than about 4.8/1. The large amount of water which is employed in the watery slurry is that amount required to render the slurry watery, runny and self-leveling. When mixed, the consistency of the slurry should be such as to resemble milk having sand particles suspended therein. If one's hand is momentarily dipped into the slurry and then removed, there is no sensation of stickiness or thickness which might be associatd with, for example, common Portland cement mixtures or mortar. One finds that the slurry, like water, drips easily from the fingers, leaving noticeably on the fingers only particles of sand and a very thin, water-like layer resembling skim milk.

The calcium sulfate hemihydrate is a pressure-calcined product in the form of a white powder. This product is available in the form of a mixture containing at least about 95% calcium sulfate hemihydrate from the Georgia-Pacific Corporation under the trade name "Densrock", and from the United States Gypsum Company under the trademark "Gyp-Stone". The "Densrock" product includes a small amount (about 2% by weight) of Portland cement to control expansion of the mixture when it sets up, and also contains minor amounts of potassium sulfate and sodium citrate. The potassium sulfate is said to control expansion and act as an accelerator to hasten the set-up time, and the sodium citrate is said to be a retarder to control setting time. The "Gyp-Stone" product includes, in addition to pressure-calcined calcium sulfate hemihydrate, small amounts of activated charcoal, gum arabic, boric acid, sugar, and a protein retarder.

The calcium sulfate hemihydrate employed in the invention is a high density, generally crystalline product having a particle size range of from about 0.5–40 microns. Under the microscope, the particles are observed to be discrete crystals of various sizes and shapes. The product may be prepared by heating lumps of gypsum in an autoclave under 15–17 p.s.i.g. steam pressure (to remove a portion of the water of crystallization, $2(CaSO_4 \cdot 2H_2O)_A(CaSO_4)_2 \cdot H_2O + 3H_2O$). This "pressure-calcined" product, when used in the slurry of the present invention, gives rise to strong, hard floors.

Conventionally manufactured calcium sulfate hemihydrate (plaster of Paris), which is prepared by heating gypsum in a kettle in a conventional manner, yields floors of low strength when mixed with sand and water to form a watery slurry. As is known, plaster of Paris is commonly employed by mixing it with water to form a paste (without addition of other ingredients significantly affecting the mixture), the moistened paste setting to a solid mass of gypsum. Under the microscope, the particles of the conventional "kettle" material appear fluffy and without crystalline form.

By virtue of the dense, crystalline particles of the "pressure-calcined" calcium sulfate hemihydrate (resulting in a relatively low surface area per unit weight), relatively less water is required in the slurry to provide the slurry with a runny, watery, self-leveling consistency, and this results in a strong, hard floor which is fast-drying. As used herein, "pressure-calcined" refers to a calcium sulfate hemihydrate having generally crystalline particles and having a particle size range of about 0.5–40 microns or above. One test for a candidate calcium sulfate hemihydrate to determine its usefulness in a slurry of the invention relates to the amount of water which must be added to a given weight of the candidate material to provide a watery mixture having the consistency of e.g., thin pancake batter or whole milk. To a 1-pound sample of the candidate material is added 8 ounces of water at room temperature, and the mixture is quickly stirred and then poured slowly out of the mixing container. The mixture should pour easily as a thin, continuous stream having the approximate consistency of thin pancake batter. If the amount of water is increased to about 10 ounces, then the mixture should have the approximate consistency of whole milk. When conventional plaster of Paris (prepared by the "kettle" process as described above) is subjected to this test, 8 ounces of water yields a mixture which pours from the mixing container as separate chunks or globs; 10 ounces of water yields "pancake batter" consistency, and 12 ounces of water yields a whole milk consistency, as described above.

This test is somewhat analogous to A.S.T.M. (American Society for Testing Materials) test C-472-73 for determining the "normal consistency" of gypsum plaster. By this test, the pressure-calcined calcium sulfate hemihydrate is said to have a normal consistency of about 45 (ml of water for 100 grams of hemihydrate), whereas the "kettle" processed material has a normal consistency of about 80–90.

The parts by weight of sand (such as Ottawa silica sand) which is employed in a slurry of the present invention depends largely upon the amount of water in the sand. The density of dry sand may range from about 95 to about 110 pounds per cubic foot, whereas the density of wet sand may range from about 100 to 120 pounds per cubic foot. With dry sand, it is desired to use a weight ratio of sand to pressure-calcined calcium sulfate hemihydrate of about 3.8/1, whereas with very wet sand, this ratio should be about 4.8/1. Generally, about twelve cubic feet of sand are employed per 300 pounds of pressure-calcined calcium sulfate hemihydrate having a purity of at least about 95%.

The amount of water which is added separately to make a slurry of the invention will depend upon the wetness of the sand, less water being required when very wet sand is used. Water is added to the slurry until the desired watery, drippy, self-leveling consistency is attained. Depending upon the wetness of the sand, water may be separately added to the slurry to give a total of about 4 to 10 parts by weight of water based on 10 parts per weight of the calcium sulfate hemihydrate.

An aqueous, film-forming polymeric latex dispersion is employed in the slurry of the invention, and may be any of the various latices used to harden concrete or mortar. It is believed that the latex, upon drying, bonds to the sand particles in the slurry to form an extremely hard, break-resistant mass. The latex is mixed into the slurry at a low concentration normally in the range of about 0.3 to about 1 percent by weight of latex solids based on the weight of pressure-calcined calcium sulfate hemihydrate. A styrene-butadiene aqueous polymeric dispersion containing about 48 percent by weight polymer solids having a polymer particle size range of about 2,000 angstroms has given excellent results; this product is sold under the trade name "Dow Latex 460" by the Dow Chemical Company. Another aqueous polymeric latex which has given good results is "Dow Latex 464", a vinylidene chloride acqueous polymeric latex having a particle size of about 1,400 angstroms and supplied at about 50% polymeric solids. These latices have been recommended for use with Portland cement at a concentration of from about 10 to 30 percent by weight of the cement. As will be described below in greater detail, when the watery slurry of the invention is poured to form a floor, the upper surface of the floor is caused to become rich in latex and calcium sulfate hemihydrate, thereby providing a hard, durable surface.

If the pressure-calcined calcium sulfate hemihydrate, sand, water and latex are violently agitated together to form a watery slurry, considerable foaming occurs, and significant amounts of foam cannot be tolerated in the slurry of the invention. To avoid foaming, an antifoam agent is added to the slurry to presumably, reduce the surface tension of the slurry. Any antifoaming agent which will reduce the tendency of the slurry of the invention to foam can be employed, and the acceptability of an antifoaming agent may be easily tested by gently mixing in a quart bottle appropriate quantities of sand, water, pressure-calcined calcium sulfate hemihydrate and the "Dow Latex 460" in the quantity set out above, adding to the mixture a small quantity (e.g. a few drops) of a candidate antifoam agent, and then violently shaking the jar to mix the ingredients. An acceptable antifoaming agent will eliminate substantially all of the foam in the agitated mixture, when agitation ceases, within about 5 seconds. Foaming agents which have given acceptable results include "WEX", a silicone-containing wetting agent manufactured by the Conklin Company, Inc., of Shakopee, Minnesota; "Worum E. B.", an ethylene glycol monobutylether sold by the Worum Chemical Company of St. Paul, Minnesota; "Antifoam B" an anionic silicone-based emulsion manufactured by the Dow Corning Corporation; and non-ionic antifoam agents based on ethoxylated linear alcohols and sold under the general trade name "Tergitol S" by the Union Carbide Corporation. Although all of these antifoam agents are operable in the present invention for the purpose of reducing or eliminating foam, the "WEX" and "Antifoam B" materials are preferred because many of the other antifoam agents are flamable or cause irritation. Only a very small amount of antifoam agent is required in the slurry of the present invention. For example, with reference to the "WEX" antifoam agent, this agent is first added to the latex at a concentration of about 0.2% and the resulting latex is then employed in the slurry at a concentration of about one quart of latex per 300 lbs. of pressure-calcined calcium sulfate hemihydrate.

As explained above, the watery slurry of the present invention should have a "set-up" time of about 20–60 minutes at about 70° F. "Set-up" time refers to the amount of time required for a watery slurry of the invention to harden into a non-flowable hard mass. Hardening of the mass ordinarily occurs with formation of a thin layer of water on the surface, and this will be described in further detail below. We have found that the set-up time of the watery slurry of the invention may vary widely depending primarily upon temperature conditions under which the floor is poured. Cold weather appears to lengthen the set-up time, whereas the opposite is true of hot weather. Moreover, we find that the layer of water which forms upon a floor poured according to the present invention evaporates rapidly under conditions of low humidity, but more slowly under conditions of high humidity. To avoid damage to walls, it is desired that the surface water be evaporated from the floor rapidly. The total time elapsing between pouring of the watery slurry onto a subfloor and evaporation of water from the surface of the subsequently set-up mass shoud be relatively short and reasonably constant; thus, on days of high humidity, a shorter set-up time is desired. Moreover, the "set-up" time of slurries of the present invention prepared from different batches of calcium sulfate hemihydrate may vary considerably.

We have found that the set-up time of the slurry of the invention can be reasonably closely controlled by the addition to the slurry of small amounts any of several well known accelerators. Potassium sulfate and aluminum sulfate have yielded excellent results as accelerators, the latter being preferred. Only minute concentrations of accelerator are used. The amount of accelerator which should be employed for a slurry of the invention on any given day will depend upon the weather conditions of temperature and humidity, as set out above, and also upon the available ventilation across the surface of the floor, the temperature of water which is added (which influences the temperature of the slurry), etc. When weather conditions change rapidly, it is not unusual for the concentration of accelerator to be changed one or more times during a single day's pour. The amount of aluminum sulfate, for example, which may be added to a batch of slurry which contains about 300 lbs. of pressure-calcined calcium sulfate hemihydrate may range from about 2 oz. to about 27 oz., depending upon the pour conditions described above. With reference to FIG. 1, equipment for manufacturing and pumping the slurry of the invention is shown in diagrammatic form generally as 10 and includes a water tank 12, a mixer 14 below the water tank and having a top opening through which water from the tank may enter the mixer, a holding hopper 16 below the mixer and having an open top for receiving the mixed slurry from the mixer, and a pump 18 below the holding hopper for receiving the mixed slurry and pumping it through a hose 18.1 into an apartment building or the like for pouring of a floor. Also shown is a belt conveyor 20 for conveying sand and pressure-calcined calcium sulfate hemihydrate into the mixer 14, and also a hopper 22 for feeding the conveyor belt 20. For convenience, the water tank 12, mixer 14, holding hopper 16, pump 18 and a portion of the conveyor belt 20 are all enclosed within the body of a large truck, with means provided for also mounting the dry mixture hopper 22 to the truck so that the equipment as a whole can be readily transported from one job site to another. With the equipment depicted, the watery slurry of the invention may be manufactured in batches within the mixer 14. With the use of the holding hopper 16, the pump 18 receives a continuous flow of slurry, thus making the pouring operation essentially continuous. Because the slurry is mixed in batches, close control may be maintained over the set-up time of the slurry. Water is supplied to the water tank 12 through a hose 12.1 which may be connected to a source of water at the job site.

Quantities of sand, and bags of pressure-calcined calcium sulfate hemihydrate are ordinarily stacked on the ground or in appropriate containers immediately outside the truck body and near the hopper 22. The latex, antifoam agent and accelerator are stored in small containers within the body of the truck for manual addition to the mixer 14. One workman ordinarily remains within the truck to control the mixing and pumping operation and to take slurry samples as desired; another workman periodically adds sand and pressure-calcined calcium sulfate hemihydrate to the hopper 22, and the remaining workmen (ordinarily 4 or 5 in number) are stationed at the interior of the apartment complex or office building where the floor is to be poured. The hose 18.1 leading from the pump 18 is ordinarily of heavy rubber, having an inner diameter of 2 inches and thus being capable of conveying the watery slurry of the invention to the pour site at fairly high volume flow rate.

The following describes a typical mixing and pouring operation:

To the hopper 22 is charged 300 lbs. of pressure-calcined calcium sulfate hemihydrate mix (containing at least 95% pressure-calcined calcium sulfate hemihydrate) and approximately 12 cubic feet of sand. The mixer operator in the truck charges about 15 gallons of water from the holding tank 12 into the mixer 14, and then starts the conveyor belt 20 to convey the sand-calcium sulfate hemihydrate mixture to the mixer. The mixer, which may be of the ribbon type, is set in motion as the dry solids are thus added. The remaining water to be added to the mix is kept in the water tank 12 and is added as the last step, since the watery consistency of the slurry is dependent upon the amount of water which is added in this last step.

A quart of the aqueous latex containing the anti-foam agent is then added to the mixture. The latex and antifoam agent preferably are mixed prior to start up of the apparatus 10. To avoid contamination of the latex or antifoam agent, we prefer to add the antifoam agent to the latex in the original latex container. For example, one pint of the antifoam agent "WEX" (described above) is added to a freshly opened 50 gallon drum of the above-described Dow Latex 460, mixing between the two liquids occurring readily by stirring with a clean spatula or other instrument. As mixing of the antifoam agent/latex with the other ingredients in the mixer proceeds, the operator will note that air bubbles which may become mixed into the mixture rise rapidly to the surface and break, thereby giving rise to little if any foaming.

The operator then adds the accelerator to the violently mixing slurry. Assuming that the weather is hot and dry, and ventilation in the building in which the floor is to be poured is good, the operator may add approximately 1 cup (about 9 oz.) of ground, tech. grade aluminum sulfate to the mixer 14.

As mixing proceeds, the operator then checks the consistency of the slurry with his hand, and adds more water if necessary to provide the slurry with a watery, runny, easily dripping consistency as described above. Mixing is continued for another few seconds, and then the resulting slurry is dropped into the holding hopper 16 which conveys the slurry to the pump 18. At this point, the operator will ordinarily remove a sample cupful of the slurry from the holding hopper and set it aside to observe the set-up time of the sample so that adjustments may be made in subsequent mix batches.

The watery slurry is pumped through the hose 18.1 into the building where the floor is to be poured. For high-rise apartment complexes and the like, it is not unusual to employ a hose up to several hundred feet in length. The residence time of the slurry in the hose is sufficiently short so that little change occurs in the consistency of the slurry between its entrance into the hose at the pump, and its delivery from the hose onto a subfloor. Care must be taken, of course, to immediately washout and cleanse the apparatus 10 and delivery hose immediately upon completion of a floor pouring operation.

Because of the heaviness of the hose 18.1, and because the hose must often be moved rapidly from room to room within an apartment or office building complex during a pouring operation, two or three workmen ordinarily man the hose with one of these workman directing the slurry issuing from the hose onto the subfloor in an amount equal to or slightly greater than the amount necessary to form the poured floor with the desired thickness. A bell signal or other means of communication is employed so that the workmen pouring the floor may signal the operator manning the equipment 10 to shut off or turn on the pump 18 as the hose is moved from one room to another. It will be evident that when a large number of rooms in an apartment or office complex are to be poured in a single day, considerable preplanning is necessary so that the rooms and hallways may be consecutively poured and that the workmen within the building may escape through an open door or window of the last room to be poured. When the watery slurry of the invention has been poured onto a significant area of the floor (e.g., 100-200 sq. ft.), a workman with high cleated boots will draw a leveling tool across the floor to insure that the proper level of slurry has been obtained. The leveling tool (not shown) may take the form of a section of 1 inch × 4 inch lumber with a straight edge having two or more nails or hooks or other spacers along its length, the spacers extending from the edge of the board for a distance equal to the thickness of floor to be poured. When the board, with spacers down, is drawn across the floor the spacers easily sink through the watery slurry and are dragged along the subfloor. The edge of the board, which is spaced above the subfloor by a distance equal to the height of the spacers, distributes slurry as needed to insure that the floor will have a uniform height. Little movement of the slurry in this manner is necessary when the thickness of the freshly poured slurry is closely estimated, the slurry being substantially self-leveling.

When freshly poured, the slurry of the invention will be of uniform consistency. For the purpose of providing the floor with a hard upper surface, the surface of the freshly poured slurry is then "finished" by lightly drawing a wooden board along the surface. The thus-described board may be termed a "darby" or "float", and the process of moving the float across the surface of the freshly poured slurry is referred to as "darbying" or "floating". This treatment further smoothens the upper surface of the slurry, and by lightly disturbing the slurry also tends to cause the upper surface of the slurry to become rich in latex and calcium sulfate hemihydrate. To avoid undue separation of the latex and calcium sulfate hemihydrate, it is desired that the upper surface of the freshly poured slurry be only very lightly floated; that is, the wooden float should be moved across the surface of the floor only one, or at most two, times.

Floats used in finishing the floors of the present invention are desirably of light weight and are made of wood, since it is important that they do not sink into the layer of watery slurry to any appreciable extent. A float may be made, for example, from a 1 inch × 4 inch × 40 inch length of redwood with the flat surface (bounded by the 4 inch × 40 inch dimensions) to be drawn across the surface of the slurry. A wooden rake handle or the like may be attached to the wooden float at an angle to facilitate its use. Floats of aluminum or other metal generally have been found to be too heavy to give the desired surface effect to slurries of the invention.

At or shortly after the floating operation water exudes from the slurry and forms a thin layer on the surface. The "setting up", or hardening, of the slurry of the invention is slightly exothermic and generally liberates enough heat to aid in rapid evaporation of the water layer from the floor; indeed, the interior of even a fairly well ventilated room may become uncomfortably hot and humid during setting up of the slurry and evaporation of the water.

The subflooring or underlayment upon which slurries of the invention are ordinarily poured when floors of large office buildings or apartment complexes are fabricated is usually of interior grade plywood. Plywood of this type can easily delaminate when soaked with water. The delamination often forms air pockets between layers of the plywood flooring which may eventually give rise to squeaky floors or other problems. In the past, it has been commonplace to attempt to seal the plywood subfloors with layers of felt paper or like materials when floors of concrete were to be poured. The use of felt paper or the like, however, did not yield good results, and in addition the adhesion, if any, of the concrete floor to the subfloor was practically unnoticeable. Because of the large quantities of water used in slurries of the present invention, proper sealing of plywood subfloors or other underlayment becomes important. It is also desirable that the poured floor have at least some adhesion to the subfloor.

We have found that plywood subflooring or underlayment can be readily sealed against subsequent delamination, and that the adhesion between the subfloor and the floor to be poured can be considerably increased if the subfloor is first wetted with an aqueous film-forming, polymeric latex dispersion such as those described above, and the thus-wetted plywood surface is allowed to dry before the slurry of the invention is poured. We have further found that the latex "seal" coating on the plywood floor eventually tends to migrate into the slurry which is poured thereon, thereby increasing the adhesion between the subfloor and the poured floor. It is believed that when a plywood subfloor is wetted with latex, the latex tends to strike into the surface of the plywood and become anchored there. The film which is formed upon drying of the latex retards seepage of water from the slurry into the plywood, and in addition, the latex tends to migrate into the wet slurry to thereby form a bond between the plywood and slurry. In actual tests, we have found that a plywood subfloor can be separated from the slurry-poured floor only with some difficulty, whereas a concrete floor which is poured onto an intermediate layer of felt paper has substantially no adhesion to the plywood subfloor.

FIGS. 2–4 show various stages in the pouring of a floor of the invention onto a subfloor of plywood. The plywood floor is designated generally as 30, and it will be understood that, for clarity, the views are largely diagrammatic. In FIG. 2, the plywood floor has been wetted with latex, such as the Dow Chemical Latex 460, the latex drying quickly to form a thin film 32. Thereafter, the watery slurry of the invention is poured onto the thus-sealed plywood subfloor 30 (FIG. 3) to form a self-leveled, homogeneous slurry layer 34. The watery slurry layer is then lightly "floated", as described above, which causes the surface of the slurry layer 34 to become rich in latex and calcium sulfate hemihydrate, and which further causes a layer of water (36 in FIG. 4) to form on the surface of the slurry layer as the slurry layer sets up. Concurrently, the latex layer 32 tends to migrate into the slurry layer 34 so that no distinct latex layer remains visually detectable.

As the slurry layer 34 sets up and the subsequent water layer 36 evaporates, the floor rapidly sets up so that it may be walked upon within, for example, an hour after pouring. The surface of the floor is hard and is highly resistant to chipping or scratching as may normally occur from the shoes and tools of workmen of other trades subsequently working in the office or apartment complex. When fully dried, nails or other fasteners can be driven through the poured floor into the subfloor without causing the poured floor to chip or crack or otherwise deform. FIG. 5 shows a "tackless" wooden carpet lath 40 which is anchored to the periphery of the poured floor by means of a nail or spike 42.

The floors prepared according to the present invention are very resistant to the passage of sound. For example, the resistance to the transmission of air-borne sound (as distinguished from impact-resultant sounds) through a wall or floor can be measured according to A.S.T.M. Test E-413–70T. The resulting test numbers are referred to as "sound transmission class" ("STC"), in which an increase in the value of the STC indicates an increase in the resistance to sound transmission. With a wall or floor of STC 25, for example, normal speech in one room can easily be understood in an adjacent room. If the wall has a STC of 42, even loud speech is audible only as a murmur. If the wall has a STC of 50, loud speech is not audible. Floors poured according to the present invention, having a thickness of ⅜ inch and poured on ⅝ inch plywood subflooring, with a ½ inch thick gypsum board exposed below and 3½ inches of building insulation in the joist cavities was tested and was found to have STC of 58, well above the sound barrier quality in which loud speech is not audible from room to room.

Similarly, the resistance of floors to the transmission of impact-caused sounds can be measured in accordance with A.S.T.M. E-492–73T. The test results are termed "impact insulation class" ("IIC") numbers, with increasing values of IIC indicating increasingly good insulation. An IIC of 73 was measured for the floor referred to next above.

Of particular value to the present invention is the rapidity and ease with which floors having the good sound resistance and hardness properties described above can be poured and finished. For example, a 7-man crew can pour and finish approximately 5,000 sq. ft. per day of a poured concrete floor. With the watery slurry and the method of the present invention, the same 7-men can easily pour and finish 20,000 to 30,000 sq. ft. per day. Moreover, workmen from other trades can walk on the thus-poured floor generally on the same day that it is poured.

Thus, manifestly, we have provided a watery, self-leveling slurry which sets up quickly into a floor of high strength having significant adhesion to plywood subfloors, a hard surface and excellent resistance to sound transmission. The floor can be poured easily and quickly by a small crew of workmen. The cost of floors of this type can thus be considerably lower than, for example, that of floors made of poured concrete or of pressed board nailed into place, and the resulting savings makes poured floors of the invention economically attractive even for low rent housing units.

While we have described a preferred embodiment of the present invention, it should be understood that various changes, adaptations, and modifications may be made therein without departing from the spirit of the invention and the scope of the appended claims.

What is claimed is:

1. Method of rapidly providing an acoustic floor covering over a subfloor, the method comprising
   a. providing a thoroughly mixed slurry comprising 10 parts by weight of pressure-calcined calcium sulfate hemihydrate, 38–48 parts by weight of sand, a hardening amount of an aqueous latex polymeric dispersion, an antifoam agent substantially preventing foam production upon violent mixing of the slurry, and sufficient water in the range of about 4 to about 10 parts by weight to provide the slurry with a watery, easily dripping, runny, self-leveling consistency;
   b. pouring the watery slurry onto the subfloor to a predetermined thickness, the slurry flowing easily into a substantially level and uniform layer upon the subfloor;
   c. lightly floating the surface of the watery slurry layer with a wooden float to provide the slurry layer with a top surface rich in latex and calcium sulfate hemihydrate, water in the slurry forming in a layer upon, and evaporating from, the top surface of the slurry layer as the latter sets up to provide a high-density, smooth, chip-resistant floor having low sound transmissivity and a hard upper surface.

2. The method according to claim 1 including the step of preliminarily wetting the subfloor with an aqueous, film-forming, polymeric latex dispersion to seal the subfloor, and substantially drying the last-mentioned latex dispersion before pouring onto the subfloor the watery slurry, the latex seal layer retarding seepage of water from the slurry into the subfloor and migrating into and becoming part of the resultant acoustic floor.

3. The method of claim 2 in which a set-up time accelerator is provided in admixture with the slurry prior to pouring of the slurry and in an amount sufficient to provide the slurry with a set-up time at 70° F. of about 20 to about 60 minutes, the slurry exhibiting an exothermic reaction upon setting up to aid in rapid evaporation of the surface water thereon.

4. Method of rapidly providing an acoustic floor covering over a subfloor, the method comprising providing a thoroughly mixed slurry which comprises 10 parts by weight of pressure-calcined calcium sulfate hemihydrate, 38–48 parts by weight of sand, and sufficient water in the range of about 4 to 10 parts by weight to provide the slurry with a watery, easily dripping, runny, self-leveling consistency; pouring the watery slurry onto the subfloor to a predetermined thickness, the slurry flowing easily into a substantially level and uniform layer upon the subfloor; and lightly floating the surface of the watery slurry layer to provide the layer with a top surface rich in calcium sulfate hemihydrate, water in the slurry forming in a layer upon, and evaporating from, the top surface of the slurry layer as the latter sets up to provide a high-density, smooth, chip-resistant floor having low sound transmissivity and a hard upper surface.

* * * * *